(12) United States Patent
Garg et al.

(10) Patent No.: US 9,396,154 B2
(45) Date of Patent: Jul. 19, 2016

(54) MULTI-CORE PROCESSOR FOR MANAGING DATA PACKETS IN COMMUNICATION NETWORK

(71) Applicants: Vakul Garg, Shahdara (IN); Bharat Bhushan, Rewari (IN)

(72) Inventors: Vakul Garg, Shahdara (IN); Bharat Bhushan, Rewari (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 339 days.

(21) Appl. No.: 14/258,046

(22) Filed: Apr. 22, 2014

(65) Prior Publication Data
US 2015/0301975 A1    Oct. 22, 2015

(51) Int. Cl.
*G06F 13/24* (2006.01)
*G06F 13/42* (2006.01)
*G06F 13/40* (2006.01)
*H04L 12/883* (2013.01)

(52) U.S. Cl.
CPC ............ *G06F 13/4221* (2013.01); *G06F 13/24* (2013.01); *G06F 13/4068* (2013.01); *H04L 49/9021* (2013.01)

(58) Field of Classification Search
CPC . G06F 13/24; G06F 13/4068; G06F 13/4221; H04L 49/901; H04L 49/9021
See application file for complete search history.

(56) References Cited

U.S. PATENT DOCUMENTS

| | | | |
|---|---|---|---|
| 6,212,593 B1 * | 4/2001 | Pham | G06F 13/32 710/22 |
| 7,765,405 B2 | 7/2010 | Pinkerton et al. | |
| 8,031,612 B2 | 10/2011 | Larsen | |
| 8,150,981 B2 | 4/2012 | Goglin et al. | |
| 2008/0077792 A1 | 3/2008 | Mann | |
| 2009/0006521 A1 | 1/2009 | Veal | |
| 2009/0086737 A1 * | 4/2009 | Fairhurst | H04L 49/90 370/394 |
| 2010/0333101 A1 | 12/2010 | Pope | |
| 2015/0281109 A1 * | 10/2015 | Saxena | H04L 49/901 370/412 |

* cited by examiner

*Primary Examiner* — Glenn A Auve
(74) *Attorney, Agent, or Firm* — Charles E. Bergere

(57) ABSTRACT

A system for managing data packets has multiple cores, a data buffer, a hardware accelerator, and an interrupt controller. The interrupt controller transmits a first interrupt signal to a first one of the cores based on a first hardware signal received from the hardware accelerator. The first core creates a copy of buffer descriptors (BD) of a buffer descriptor ring that correspond to the data packets in the data buffer in a first virtual queue and indicates to the hardware accelerator that the data packets are processed. If there are additional data packets, the interrupt controller transmits a second interrupt signal to a second core, which performs the same steps as performed by the first core. The first and the second cores simultaneously process the data packets associated with the BDs in the first and second virtual queues, respectively.

19 Claims, 4 Drawing Sheets

MULTI-CORE PROCESSOR FOR MANAGING DATA PACKETS IN COMMUNICATION NETWORK

BACKGROUND OF THE INVENTION

The present invention relates generally to processors, and, more particularly, to a multi-core processor for managing data packets in a communication network.

Communication networks including computer networks, telephone networks, and cellular networks are implemented using various technologies such as circuit-switching, packet-switching, and message-switching. Packet-switched networks are digital networks in which multiple digital systems such as gateways, switches, access points, and base stations communicate using data packets. The digital systems may include a single processor or a multi-core processor for processing the data packets. A multi-core processor includes two or more cores that distribute the received data packets among themselves for processing using a technique referred to as receive side-scaling. Receive side-scaling ensures efficient resource (core) utilization and the system can support a large load of data packets. The system further includes a memory and a hardware accelerator. The memory includes a data buffer that stores the data packets. The hardware accelerator assists the cores in processing the data packets by performing additional functions such as encryption, cryptography, pattern matching, and decoding of the data packets. Examples of the hardware accelerator include off-load accelerators such as cryptographic co-processors, compression accelerators, pattern-matching accelerators, encryption hardware accelerators and input/output (I/O) accelerators such as security encryption controllers, Ethernet controllers, and network-attached storage accelerators. The data packets may either be received over the digital network or generated by the digital system. The hardware accelerator and the cores communicate using buffer descriptor (BD) rings.

The BD rings are stored in the memory. Each BD ring stores a plurality of BDs in the form of an array. The BD holds a pointer to a data packet stored in the data buffer and describes status, size, and location of the data packet. The BD rings are of two types: a transmit BD ring and a receive BD ring. The transmit BD ring includes BDs corresponding to the data packets that are processed by the cores. The hardware accelerator polls the transmit BD ring to check for availability of such data packets, processes the data packets, and transmits the processed data packets either over the digital network or back to the cores for further processing. The receive BD ring includes BDs corresponding to the data packets that are received by the hardware accelerator over the digital network. The data packets are processed by the hardware accelerator and are transmitted to the cores for further processing. The receive BD ring is polled by the cores to check for availability of such data packets (which is typically done under a deferred processing context such as a tasklet).

The hardware accelerator stores the data packets in the data buffer and associates each data packet with a corresponding BD. When the BDs are ready, the hardware accelerator provides a hardware signal to an interrupt controller of the digital system. The interrupt controller includes a status table that stores the status of the multiple cores. The status of a core is determined based on whether the core has been assigned any data packets for processing. If the core is not assigned any data packets for processing, the status is marked as 'idle' and if the core is assigned data packets for processing, the status is marked as 'busy'. The interrupt controller selects a core that has a corresponding status marked as 'idle'. The interrupt controller also generates an interrupt signal upon receiving the hardware signal and transmits the interrupt signal to the selected core, to notify the selected core of the ready BDs. The selected core receives the interrupt signal and invokes an interrupt service routine (ISR) to service the interrupt.

The selected core selects a BD ring that includes the ready BDs and begins processing corresponding data packets. The selected core does not transfer the interrupt signal to another core until it has finished processing the data packets. Thus, the idle cores remain idle even though the data buffer may hold unprocessed data packets. When the selected core finishes processing the data packets, the interrupt controller generates and transfers a subsequent interrupt signal to the next idle core, which then commences processing the unprocessed data packets of the BD ring. The cores access the BD ring serially and there is no mechanism by which multiple idle cores can simultaneously process the data packets associated with the BD ring. Thus, the processing speed of the system is limited to the processing speed of a single core.

To overcome the aforementioned problem, a software-based packet-steering approach has been used in which the interrupt signal received from the hardware accelerator is transmitted to a single core. The core invokes an ISR to service the interrupt signal and receives the data packets and steers the data packets to backlog queues, i.e., ingress buffers of the other cores based on a classification of the received data packets. Thus, multiple cores can simultaneously process the data packets from the backlog queues. However, software-based packet-steering adopts a centralized work distribution mechanism, i.e., the data packets are distributed to the multiple cores by a single core causing the steering rate to be limited to the processing speed of the single core. Moreover, the classification and steering of the received data packets requires additional instruction cycles of the core, which leads to an increase in system cycle time.

In another packet-steering approach, the hardware accelerator applies a hash function on a set of bits (e.g., first four bits of IP header) of a received data packet and calculates a corresponding hash result. The hardware accelerator includes an indirection table that is used to direct the received data packet to a particular core based on the hash result. Each entry in the indirection table includes a hash result and a corresponding backlog queue of the core. The hardware accelerator identifies a core to process the received data packet based on the hash result and transmits the data packet to the backlog queue of the identified core. Thus, the received data packets are classified and steered directly to the backlog queues of the cores by the hardware accelerator. As the steering is not performed by a single core, the steering rate is not limited by the processing speed of the single core. However, the classification and steering mechanism requires additional hardware.

Therefore, it would be advantageous to have a multi-core digital system that has an efficient distributed work sharing mechanism.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
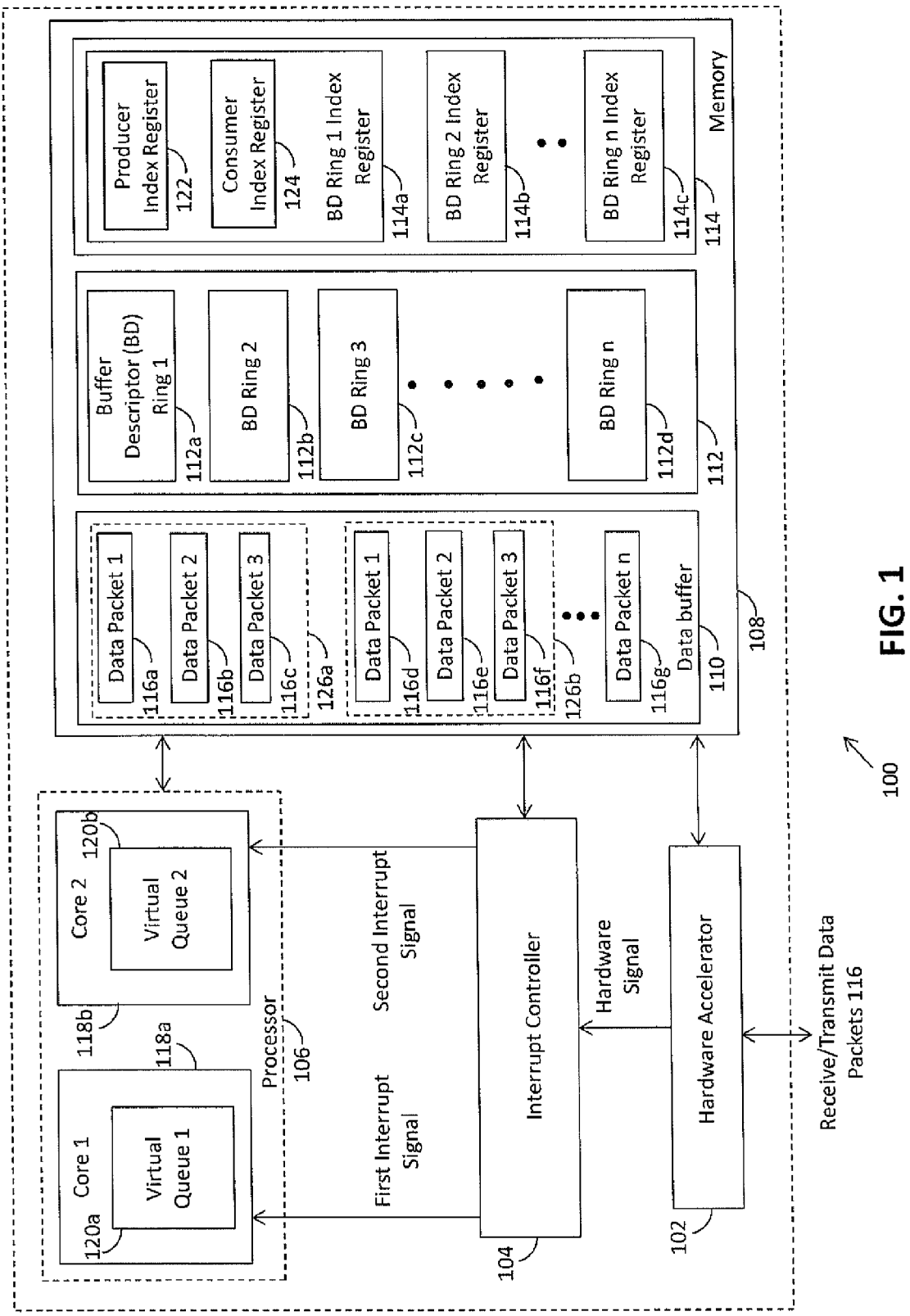
FIG. 1 is a schematic block diagram of a system-on-chip (SoC) for processing a plurality of data packets in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system-on-chip (SoC) that processes a plurality of data packets is provided. The SoC includes a plurality of cores, a data buffer, a memory, a hardware accelerator, and an interrupt controller. The data buffer stores the plurality of data packets. The memory stores a plurality of buffer descriptor rings. Each buffer descriptor ring includes a plurality of buffer descriptors and a buffer descriptor corresponds to a data packet. The hardware accelerator receives the plurality of data packets, associates each data packet to a corresponding buffer descriptor, and generates a first hardware signal when a first set of data packets of the plurality of data packets is stored in the data buffer. The interrupt controller is connected to the hardware accelerator and includes a status table corresponding to the plurality of cores. The interrupt controller selects a first core of the plurality of cores based on the status table, generates a first interrupt signal based on the first hardware signal, and transmits the first interrupt signal to the first core. The first core creates a copy of a first set of buffer descriptors of a first buffer descriptor ring of the plurality of buffer descriptor rings in a first virtual queue thereof, thereby indicating the hardware accelerator that the first set of data packets is processed. The first set of buffer descriptors correspond to the first set of data packets. The hardware accelerator generates a second hardware signal when a second set of data packets of the plurality of data packets is stored in the data buffer.

In another embodiment of the present invention, a method of processing a plurality of data packets in a system-on-chip (SoC) is provided. The SoC includes a plurality of cores, a data buffer, and a memory. The data buffer stores the plurality of data packets. The memory stores a plurality of buffer descriptor rings. Each buffer descriptor ring includes a plurality of buffer descriptors and a buffer descriptor corresponds to a data packet. The method includes receiving the plurality of data packets. A first hardware signal is generated when a first set of data packets of the plurality of data packets are stored in the data buffer. A first core of the plurality of cores is selected. A copy of a first set of buffer descriptors of a first buffer descriptor ring of the plurality of buffer descriptor rings that correspond to the first set of data packets is created in a first virtual queue of the first core, thereby indicating that the first set of data packets is processed. A second hardware signal is generated when a second set of data packets of the plurality of data packets are stored in the data buffer.

In yet another embodiment of the present invention, a method of processing a plurality of data packets in a system-on-chip (SoC) is provided. The SoC includes a plurality of cores, a data buffer, and a memory. The data buffer stores the plurality of data packets. The memory stores a plurality of buffer descriptor rings. Each buffer descriptor ring includes a plurality of buffer descriptors and a buffer descriptor corresponds to a data packet. The method includes receiving the plurality of data packets. A first hardware signal is generated when a first set of data packets of the plurality of data packets are stored in the data buffer. A first core of the plurality of cores is selected. A copy of a first set of buffer descriptors of a first buffer descriptor ring of the plurality of buffer descriptor rings that correspond to the first set of data packets is created in a first virtual queue of the first core, thereby indicating that the first set of data packets is processed. A second hardware signal is generated when a second set of data packets of the plurality of data packets are stored in the data buffer. A second core of the plurality of cores is selected. A copy of a second set of buffer descriptors of the first buffer descriptor ring that correspond to the second set of data packets is created in a second virtual queue of the second core. The first and second sets of data packets are processed simultaneously by the first and second cores, respectively.

Various embodiments of the present invention provide a system-on-chip (SoC) that processes a plurality of data packets in a communication network. The SoC includes a plurality of cores, a data buffer, a memory, a hardware accelerator, and an interrupt controller. The hardware accelerator receives and stores a plurality of data packets in the data buffer, associates each data packet to a corresponding buffer descriptor, and provides a first hardware signal to the interrupt controller. The interrupt controller selects a first core of the plurality of cores (that is 'idle'), and provides a first interrupt signal to the first core. The first core copies a first set of buffer descriptors of a first buffer descriptor ring that is associated with a first set of data packets in a first virtual queue thereof, thereby indicating the hardware accelerator that the first set of data packets is processed. The interrupt controller then selects a second core to process a second set of data packets that is received subsequent to the first set of data packets. The second core creates a copy of the second set of buffer descriptors of the first buffer descriptor ring that corresponds to the second set of data packets in a second virtual queue thereof, thereby indicating the hardware accelerator that the second set of data packets is processed. The first and second cores simultaneously process the first and second sets of data packets, respectively. The distributed work sharing mechanism enhances the processing speed of the SoC as the processing speed is not restricted to that of a single core. Moreover, the SoC does not perform packet classification and steering and hence additional hardware logic is not required, thereby reducing area overheads.

Referring now to FIG. 1, a schematic block diagram of an SoC 100 in accordance with an embodiment of the present invention is shown. The SoC 100 is a part of digital systems such as access points and base stations of a communication network. Examples of networks include computer networks, telephone networks, and cellular networks. The SoC 100 includes a hardware accelerator 102, an interrupt controller 104, a multi-core processor 106, and a memory 108. Examples of the hardware accelerator 102 include offload accelerators such as cryptographic co-processors, compression accelerators, pattern-matching accelerators, encryption hardware accelerators and input/output (I/O) accelerators such as security encryption controllers, Ethernet controllers, and network-attached storage accelerators. The memory 108 includes a data buffer 110, a plurality of buffer descriptor (BD) rings 112 including first through fourth BD rings 112a-112d (collectively referred to as BD rings 112), and corresponding plurality of BD ring index registers 114 including first through third BD ring index registers 114a-114c (collectively referred to as BD ring index registers 114). It will be appreciated by those of skill in art that the BD rings 112 may be stored in a memory (not shown) of the hardware accelerator 102 as well.

The hardware accelerator 102 receives a plurality of data packets 116 including first through seventh data packets 116a-116g and processes and stores the data packets 116 in the data buffer 110. In an embodiment of the present invention, the hardware accelerator 102 receives the data packets 116 from the communication network. In another embodiment of the present invention, the hardware accelerator 102 receives the data packets 116 from the multi-core processor 106. The hardware accelerator 102 assists the multi-core processor 106 to process the data packets 116 by performing special functions including encryption, cryptography, pattern matching, and decoding of the data packets 116 and consequently, increases the processing speed of the SoC 100. The multi-core processor 106 includes a plurality of cores 118 including first and second cores 118a and 118b that process the data packets 116. The first and second cores 118a and 118b include first and second virtual queues, 120a and 120b, respectively. The first and second virtual queues 120a and 120b are implemented as memory arrays in the first and second cache memories (not shown) of the first and second cores 118a and 118b, respectively.

Figure 2:
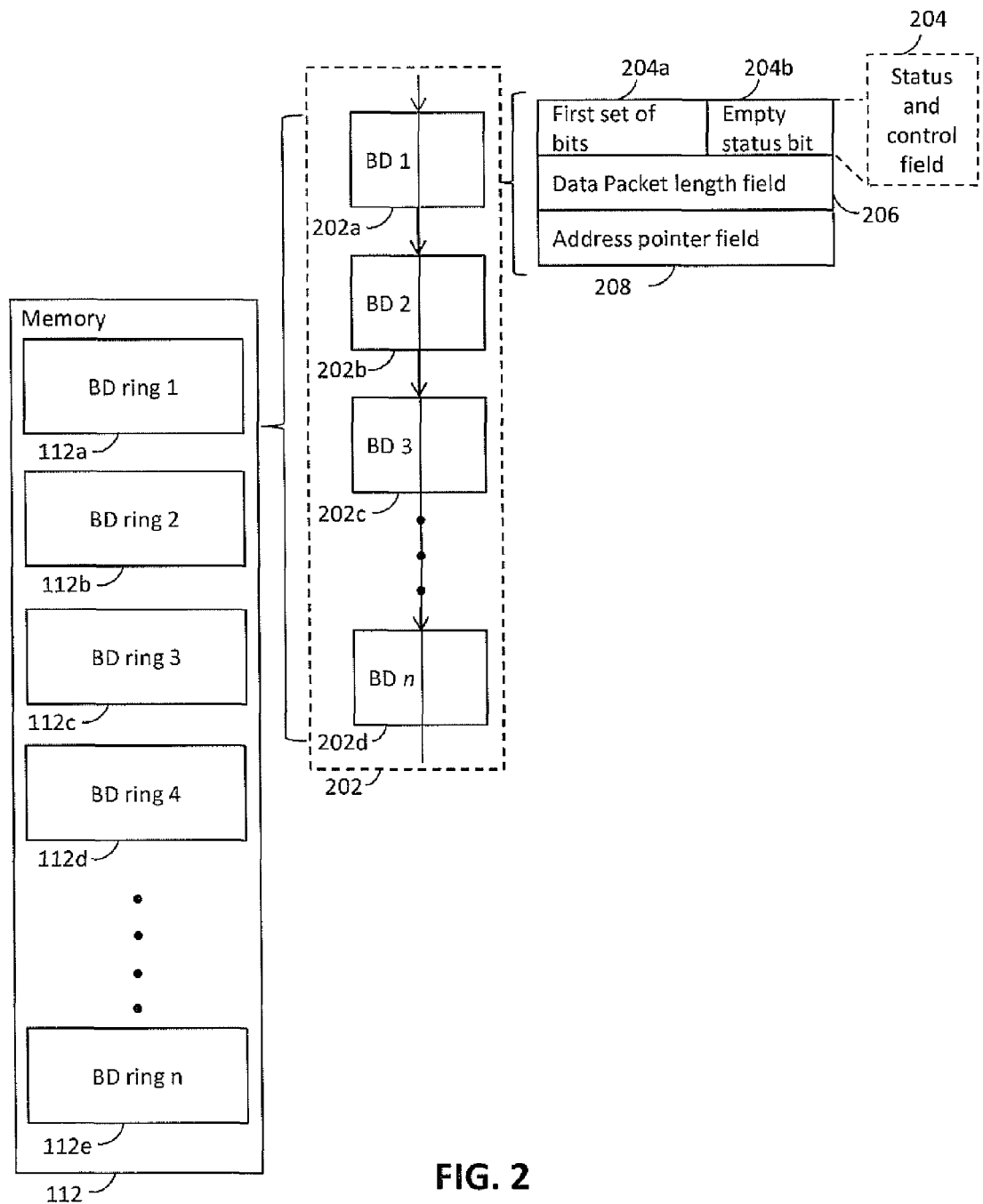
FIG. 2 is a schematic block diagram illustrating buffer descriptor (BD) rings and corresponding BDs in accordance with an embodiment of the present invention.

Referring now to FIG. 2, a schematic block diagram illustrating the BD rings 112 and corresponding BDs 202 in accordance with an embodiment of the present invention is shown. Each BD ring 112 includes multiple BDs 202 that are arranged in the form of a linked list. Further each BD 202 corresponds to a received data packet 116 and includes a status and control field, a data packet length field, and an address pointer field. The hardware accelerator 102 associates the data packets 116 to the corresponding BDs 202. In an example, the first BD ring 112a includes first through fourth BDs 202a-202d that are associated with the first through fourth data packets 116a-116d, respectively. The first BD 202a includes a status and control field 204, a data packet length field 206, and an address pointer field 208. The status and control field 204 stores status and control information of the first BD 202a by using a first set of bits 204a and an empty status bit 204b. The first set of bits 204a stores information such as a position of the first BD 202a (first or last) in the first BD ring 112a and whether the multi-core processor 106 or the hardware accelerator 102 accesses the first BD ring 112a. The empty status bit 204b indicates whether the first BD 202a is empty or is associated with the first data packet 116a. The data packet length field 206 indicates the size of the first data packet 116a. The address pointer field 208 stores the address of the first data packet 116a in the data buffer 110. The ownership of the BDs 202 toggles between the hardware accelerator 102 and the multi-core processor 106. When the ownership of the BDs 202 is with the multi-core processor 106, the multi-core processor 106 processes the data packets 116 corresponding to the BDs 202 and the hardware accelerator 102 processes the data packets 116 when the ownership is with the hardware accelerator 102.

The first BD ring index register 114a is associated with the first BD ring 112a and includes producer and consumer index registers 122 and 124. The producer index register 122 stores a count of the BDs 202 associated with the data packets 116 that are processed by the hardware accelerator 102. The consumer index register 124 stores a count of the BDs 202 associated with the data packets 116 that are processed by the multi-core processor 106. The difference in the counts stored by the producer and consumer index registers 122 and 124 indicates the number of data packets 116 that await processing by the multi-core processor 106.

In an example, the hardware accelerator 102 receives, processes, and stores the first through third data packets 116a-116c in the data buffer 110, associates the first through third data packets 116a-116c with the first through third BDs 202a-202c, respectively, and increments the producer index register 122. The first through third data packets 116a-116c are referred to as a first set of data packets 126a. Thereafter, the hardware accelerator 102 generates and transmits a first hardware signal to the interrupt controller 104. The hardware accelerator 102 includes a BD ring interrupt event status register (not shown) that stores a BD ring interrupt status bit which indicates whether the first hardware signal is serviced or not, i.e., whether the first set of data packets 126a is processed or not. When the hardware accelerator 102 transmits the first hardware signal to the interrupt controller 104, the BD ring interrupt status bit is set, thereby indicating that the first hardware signal is to be serviced.

The interrupt controller 104 receives the first hardware signal and generates a first interrupt signal. The interrupt controller 104 includes a status table (not shown) that stores the status of the first and second cores 118a and 118b. In an example, the first and second cores 118a and 118b have corresponding statuses marked as 'idle'. The interrupt controller 104 transmits the first interrupt signal to the first core 118a. It will be apparent to those of skill in art that the interrupt controller 104 may select the first core 118a by a round-robin scheduling method or by selecting the first available idle core of the first and second cores 118a and 118b.

The first core 118a receives the first interrupt signal, which invokes an interrupt service routine (ISR) of the first core 118a that is a part of a device driver of the first core 118a. The ISR creates a copy of the first through third BDs 202a-202c in the first virtual queue 120a. The BDs 202a-202c stored in the first virtual queue 120a await processing by the first core 118a. The ISR, then, increments the consumer index register 124 and sets the status of the first core 118a as busy in the status table of the interrupt controller 104, thus implying that the first interrupt signal is serviced and the first core 118a is unavailable for processing of the data packets 116 that are received subsequent to the first set of data packets 126a. The ISR clears the BD ring interrupt status bit of the hardware accelerator 102 and indicates the hardware accelerator 102 that the first set of data packets 126a is processed by the first core 118a. The first core 118a commences processing of the first set of data packets 126a thereafter.

Upon receiving the fourth through sixth data packets 116d-116f (referred to as a second set of data packets 126b), the hardware accelerator 102 processes and stores the second set of data packets 126b in the data buffer 110, associates the fourth through sixth data packets 116d-116f with the fourth through sixth BDs 202d-202f (not shown) of the BD ring 112a, respectively, and increments the producer index register 122. Thereafter, the hardware accelerator 102 generates and transmits a second hardware signal to the interrupt controller 104. When the hardware accelerator 102 transmits the second hardware signal, the BD ring interrupt status bit is set which indicates that the second hardware signal is to be serviced.

The interrupt controller receives the second hardware signal generates a second interrupt signal. As the first core 118a is busy processing the first set of data packets 126a, the status of the first core 118a is marked 'busy' in the status table, and the interrupt controller 104 transmits the second interrupt signal to the second core 118b.

The second core 118b receives the second interrupt signal, which invokes an interrupt service routine (ISR) of the second core 118b that is a part of a device driver of the second core 118b. The ISR creates a copy of the fourth through sixth BDs 202d-202f in the second virtual queue 120b of the second core 118b. The BDs 202d-202f stored in the second virtual queue 120b await processing by the second core 118b. The ISR, then, increments the consumer index register 124 and sets the status of the second core 118b as 'busy' in the status table of the interrupt controller 104, thus implying that the second interrupt signal is serviced and the second core 118b is unavailable for processing of the data packets 116 that are received subsequent to the second set of data packets 126b. The ISR clears the BD ring interrupt status bit of the hardware accelerator 102 and indicates the hardware accelerator 102 that the second set of data packets 126b is processed by the second core 118b. The second core 118b commences processing of the second set of data packets 126b thereafter. The first and second cores 118a and 118b simultaneously process the first and second sets of data packets 126a and 126b, thereby increasing the processing speed of the multi-core processor 106.

Figure 3:
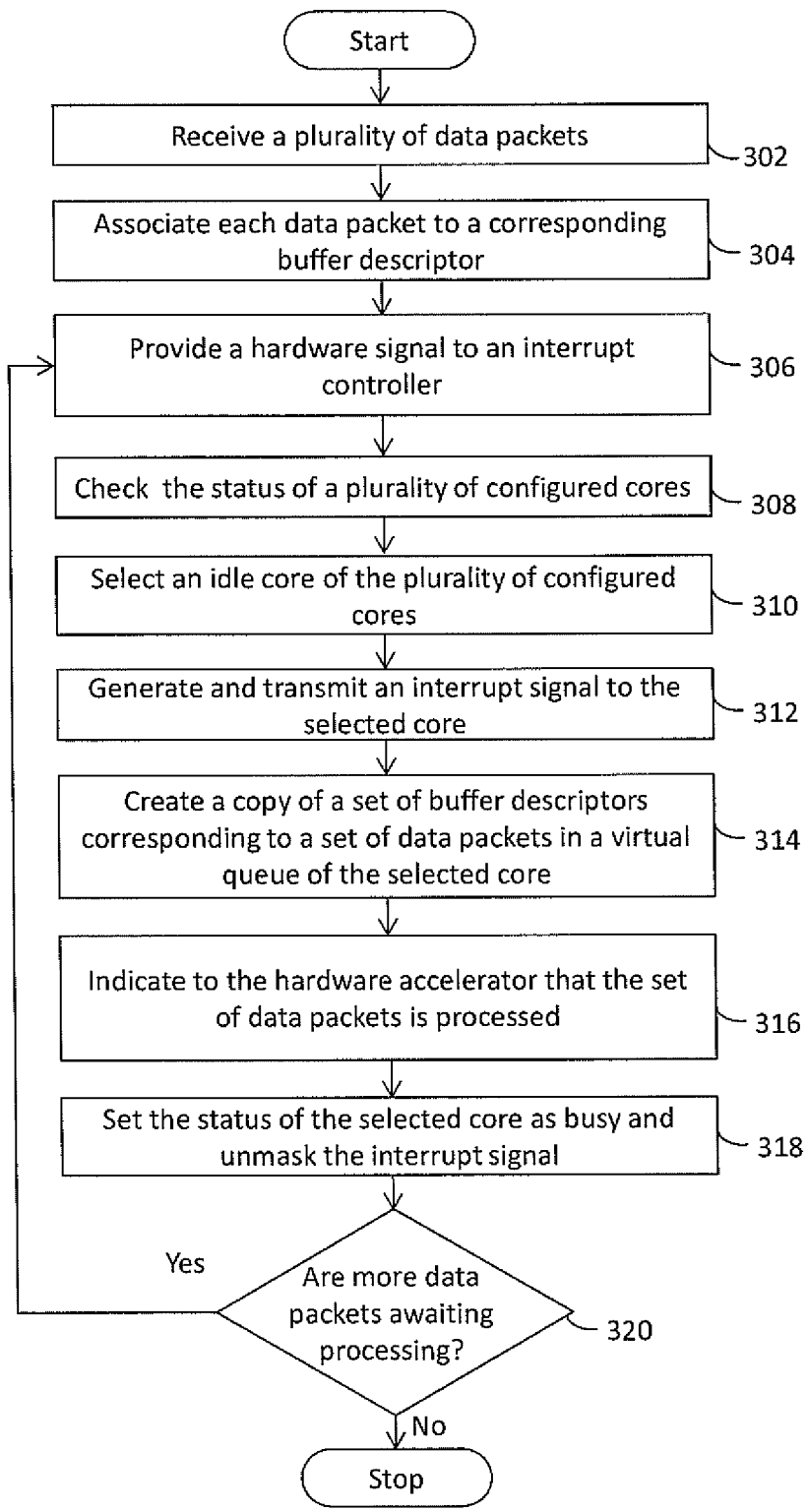
FIG. 3 is a flow chart illustrating a method of distributing a plurality of data packets to multiple cores in a multi-core processor in accordance with an embodiment of the present invention.

Referring now to FIG. 3, a flowchart illustrating a method of distributing the data packets 116 to the first and second cores 118a and 118b in the multi-core processor 106 in accordance with an embodiment of the present invention is shown. At step 302, the hardware accelerator 102 receives the first set of data packets 126a. At step 304, the hardware accelerator 102 associates the first through third data packets 116a-116c of the first set of data packets 126a to the first through third BDs 202a-202c of the BD ring 112a, respectively. At step 306, the hardware accelerator 102 provides the first hardware signal to the interrupt controller 104 based on the first set of data packets 126a. At step 308, the interrupt controller 104 checks the status of the first and second cores 118a and 118b and identifies the status thereof as 'idle'. At step 310, the first core 118a is selected. At step 312, the interrupt controller 104 generates and transmits the first interrupt signal to the first core 118a. At step 314, the ISR of the first core 118a creates a copy of the first through third BDs 202a-202c in the first virtual queue 120a. At step 316, the ISR of the first core 118a indicates the hardware accelerator 102 that the first set of data packets 126a is processed. At step 318, the ISR of the first core 118a sets the status of the first core 118a as busy and unmasks the first interrupt signal. At step 320, a check is performed to determine whether the second set of data packets 126b awaits processing. If it is determined, at step 320, that the second set of data packets 126b awaits processing, steps 306-318 are repeated by selecting the second core 118a at step 310.

Figure 4:
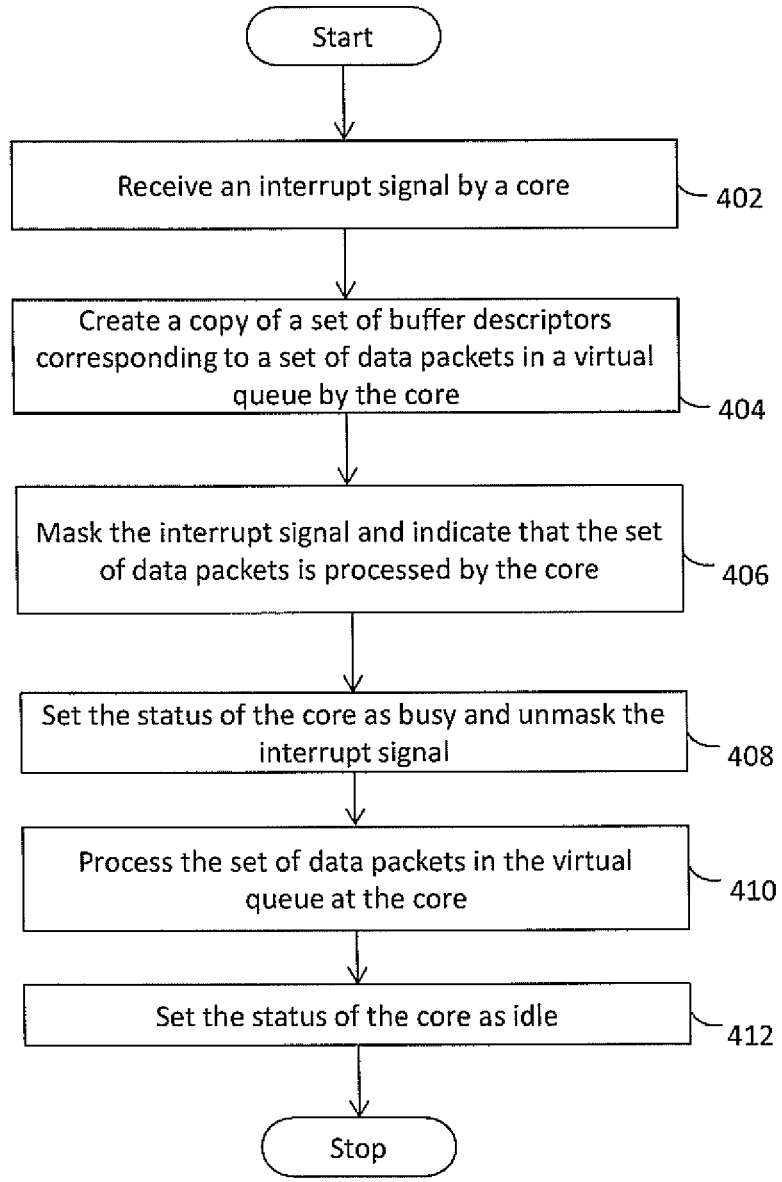
FIG. 4 is a flow chart illustrating a method of processing the plurality of data packets by a core in accordance with an embodiment of the present invention.

Referring now to FIG. 4, a flowchart illustrating a method of processing the first set of data packets 126a by the first core 118a in accordance with an embodiment of the present invention is shown. At step 402, the first core 118a receives the first interrupt signal based on the first set of data packets 126a. At step 404, the ISR of the first core 118a creates a copy of the first through third BDs 202a-202c of the first BD ring 112a corresponding to the first through third data packets 116a-116c of the first set of data packets 126a in the first virtual queue 120a. At step 406, the ISR of the first core 118a masks the first interrupt signal and indicates the hardware accelerator 102 that the first set of data packets 126a is processed by the first core 118a. At step 408, the ISR of the first core 118a sets the status of the first core 118a as 'busy' in the status table. At step 410, the first core 118a processes the first set of data packets 126a. At step 412, the ISR of the first core 118a sets the status of the first core 118a as 'idle' in the status table. It will be apparent to those of skill in art that the other cores 118 of the multi-core processor 106 perform similar functions as described in FIG. 4, for processing the data packets 116.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system-on-chip (SoC) for processing data packets, the SoC comprising:
    a plurality of cores;
    a data buffer for storing the data packets;
    a memory for storing a plurality of buffer descriptor rings, wherein each buffer descriptor ring includes a plurality of buffer descriptors, and a buffer descriptor corresponds to a data packet;
    a hardware accelerator that receives the data packets, associates each data packet with a corresponding buffer descriptor, and generates a first hardware signal when a first set of the data packets is stored in the data buffer; and
    an interrupt controller, connected to the hardware accelerator, the interrupt controller including a status table corresponding to the plurality of cores for selecting a first core of the plurality of cores, wherein the interrupt controller:
        selects the first core using the status table; and
        generates a first interrupt signal based on the first hardware signal and transmits the first interrupt signal to the first core,
    wherein the first core:
        creates a first virtual queue for storing a copy of a first set of buffer descriptors of a first buffer descriptor ring of the plurality of buffer descriptor rings that correspond to the first set of data packets, and
        indicates to the hardware accelerator that the first set of data packets is processed, and
    wherein the hardware accelerator generates a second hardware signal when a second set of the data packets is stored in the data buffer.

2. The SoC of claim 1, wherein the interrupt controller further:
    selects a second core of the plurality of cores using the status table;
    generates a second interrupt signal based on the second hardware signal, and transmits the second interrupt signal to the second core,
    wherein the second core:
        creates a second virtual queue and stores a copy of a second set of buffer descriptors of the first buffer descriptor ring that corresponds to the second set of data packets; and
        indicates to the hardware accelerator that the second set of data packets are processed.

3. The SoC of claim 2, wherein the first and second cores simultaneously process the first and second sets of data packets from the first and second virtual queues, respectively.

4. The SoC of claim 2, wherein the first and second cores include first and second interrupt service routines that mask the first and second interrupt signals, respectively, when the first and second cores create the copies of the first and second sets of buffer descriptors, respectively.

5. The SoC of claim 1, wherein the memory further includes a plurality of buffer descriptor ring index registers corresponding to the plurality of buffer descriptor rings, wherein the plurality of buffer descriptor ring index registers include corresponding producer and consumer index registers.

6. The SoC of claim 5, wherein the hardware accelerator increments a producer index register corresponding to a buffer descriptor ring when a data packet is associated to a corresponding buffer descriptor of the buffer descriptor ring.

7. The SoC of claim 5, wherein a core increments a consumer index register corresponding to a buffer descriptor ring when the core creates a copy of a buffer descriptor of the buffer descriptor ring in a virtual queue.

8. The SoC of claim 1, wherein the status table stores at least one of a busy and an idle status for each of the cores of the plurality of cores.

9. The SoC of claim 8, wherein the status table stores an idle status corresponding to the first core when the first core finishes processing the first set of data packets.

10. The SoC of claim 1, wherein the hardware accelerator comprises at least one of an Ethernet controller, a cryptographic accelerator, a pattern-matching accelerator, and a compression accelerator.

11. A method of processing a plurality of data packets in a system-on-chip (SoC) that includes a plurality of cores, a data buffer that stores the plurality of data packets, a memory that stores a plurality of buffer descriptor rings, wherein each buffer descriptor ring includes a plurality of buffer descriptors and a buffer descriptor corresponds to a data packet, the method comprising:
   receiving the plurality of data packets;
   generating a first hardware signal when a first set of data packets of the plurality of data packets are stored in the data buffer;
   selecting a first core of the plurality of cores;
   creating a copy of a first set of buffer descriptors of a first buffer descriptor ring of the plurality of buffer descriptor rings corresponding to the first set of data packets in a first virtual queue of the first core;
   indicating that the first set of data packets is processed; and
   generating a second hardware signal when a second set of data packets of the plurality of data packets are stored in the data buffer.

12. The method of claim 11, further comprising:
   selecting a second core of the plurality of cores;
   creating a copy of a second set of buffer descriptors of the first buffer descriptor ring corresponding to the second set of data packets in a second virtual queue of the second core; and
   indicating that the second set of data packets is processed.

13. The method of claim 11, wherein the memory further stores a plurality of buffer descriptor ring index registers, corresponding to the plurality of buffer descriptor rings, that include corresponding producer and consumer index registers.

14. The method of claim 13, further comprising incrementing a producer index register corresponding to a buffer descriptor ring when a data packet is associated to a corresponding buffer descriptor of the buffer descriptor ring.

15. The method of claim 13, further comprising incrementing a consumer index register corresponding to a buffer descriptor ring when a core creates a copy of a buffer descriptor of the buffer descriptor ring in a virtual queue thereof.

16. A method of processing a plurality of data packets in a system-on-chip (SoC) that includes a plurality of cores, a data buffer that stores the plurality of data packets, a memory that stores a plurality of buffer descriptor rings, wherein each buffer descriptor ring includes a plurality of buffer descriptors and a buffer descriptor corresponds to a data packet, the method comprising:
   receiving the plurality of data packets;
   generating a first hardware signal when a first set of data packets of the plurality of data packets are stored in the data buffer;
   selecting a first core of the plurality of cores;
   creating a copy of a first set of buffer descriptors of a first buffer descriptor ring of the plurality of buffer descriptor rings corresponding to the first set of data packets in a first virtual queue of the first core;
   indicating that the first set of data packets is processed;
   generating a second hardware signal when a second set of data packets of the plurality of data packets are stored in the data buffer;
   selecting a second core of the plurality of cores;
   creating a copy of a second set of buffer descriptors of the first buffer descriptor ring corresponding to the second set of data packets in a second virtual queue of the second core;
   indicating that the second set of data packets is processed; and
   processing the first and second sets of data packets, simultaneously, by the first and second cores, respectively.

17. The method of claim 16, wherein the memory further stores a plurality of buffer descriptor ring index registers, corresponding to the plurality of buffer descriptor rings, that include corresponding producer and consumer index registers.

18. The method of claim 17, further comprising incrementing a producer index register corresponding to a buffer descriptor ring when a data packet is associated to a corresponding buffer descriptor of the buffer descriptor ring.

19. The method of claim 17, further comprising incrementing a consumer index register corresponding to a buffer descriptor ring when a core creates a copy of a buffer descriptor of the buffer descriptor ring in a virtual queue thereof.

* * * * *